J. R. CARLSON.
INSECT TRAP AND DESTROYER.
APPLICATION FILED AUG. 12, 1918.
1,294,615.
Patented Feb. 18, 1919.
2 SHEETS—SHEET 2.
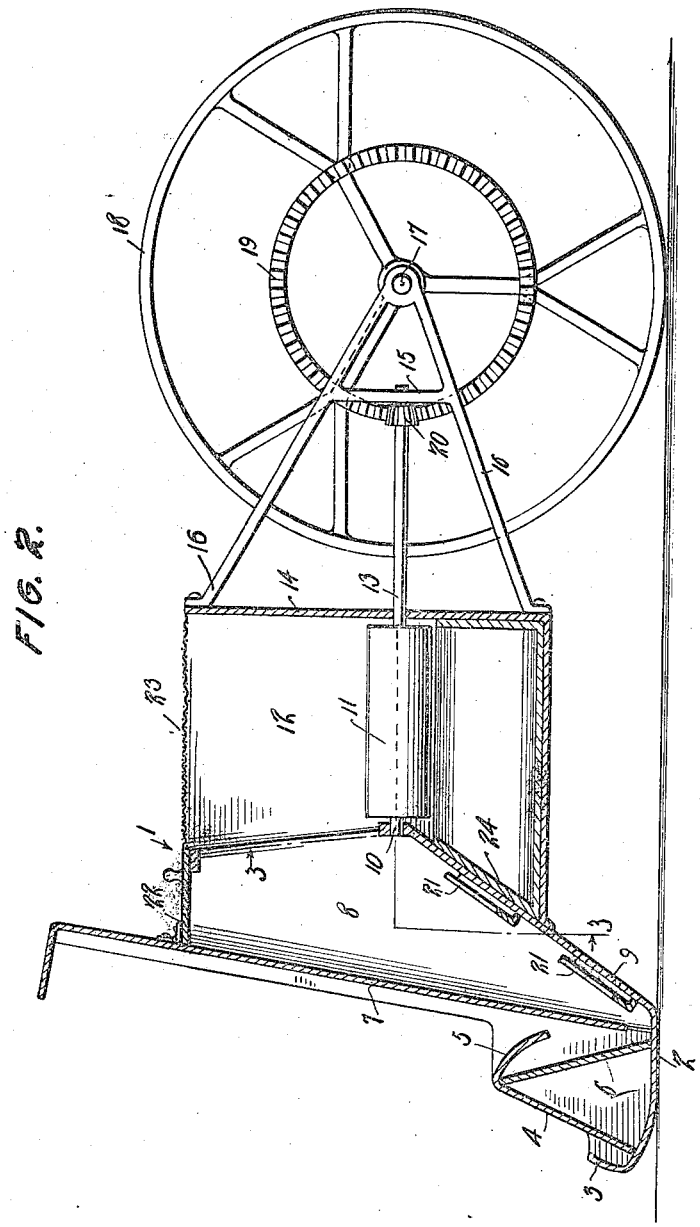
WITNESSES
INVENTOR
Jewett R. Carlson
BY
ATTORNEY

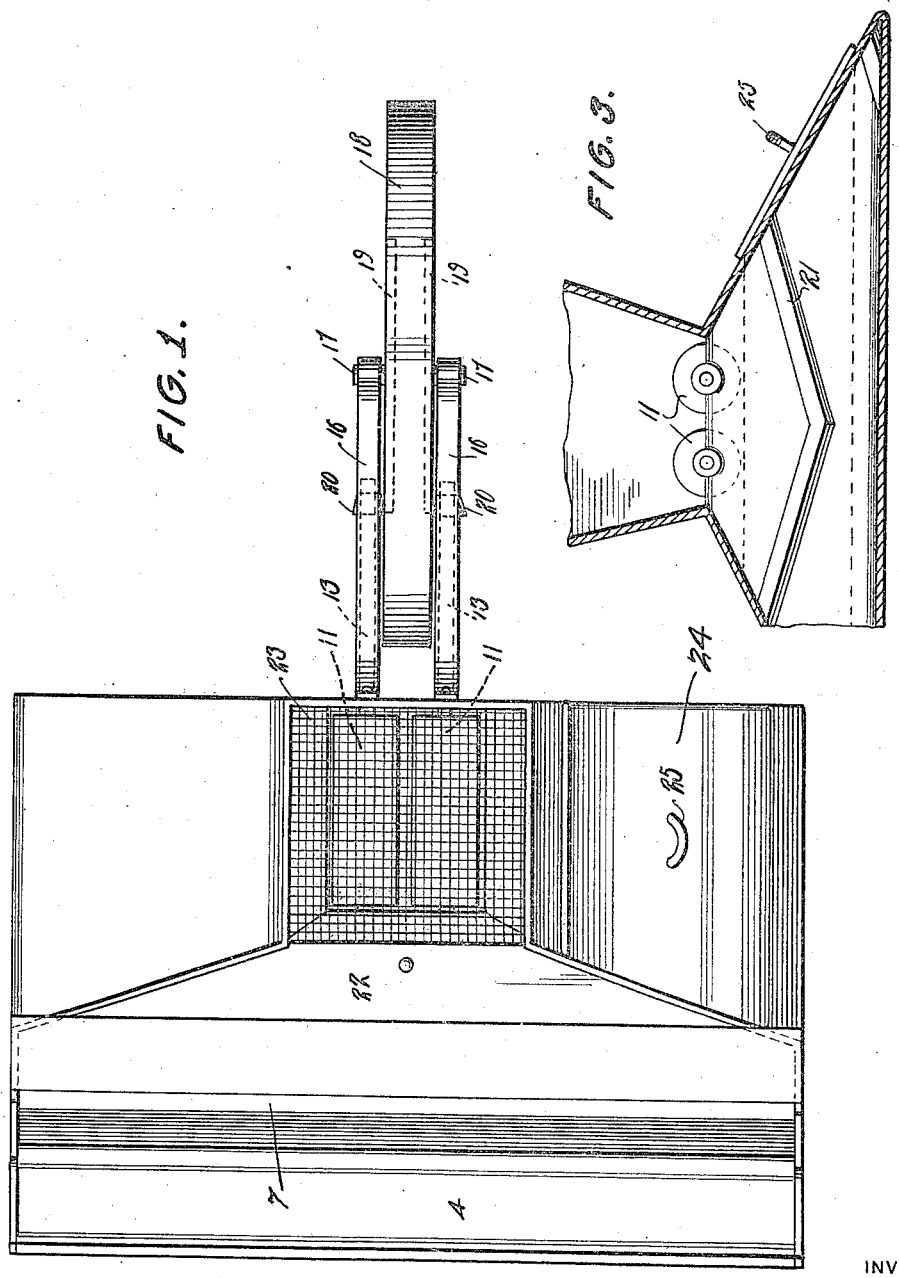

UNITED STATES PATENT OFFICE.

JEWETT R. CARLSON, OF WEST SALEM, WISCONSIN.

INSECT TRAP AND DESTROYER.

1,294,615.     Specification of Letters Patent.     Patented Feb. 18, 1919.

Application filed August 12, 1918. Serial No. 249,542.

*To all whom it may concern:*

Be it known that I, JEWETT R. CARLSON, a citizen of the United States, residing at West Salem, in the county of La Crosse and State of Wisconsin, have invented certain new and useful Improvements in Insect Traps and Destroyers, of which the following is a specification.

This invention relates to insect traps and more particularly to grasshopper catchers and destroyers.

The object of the invention is to provide a simple and efficient machine for trapping and killing grasshoppers.

Another object is to provide an apparatus of this character, the killing means of which is operated by the movement of the machine over the ground.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of one embodiment of an apparatus constructed in accordance with this invention.

Fig. 2 is a longitudinal section thereof, and

Fig. 3 is a detail vertical section taken on the line 3—3 of Fig. 2.

In the embodiment illustrated, a receptacle 1 is shown having a flat bottom 2 at its front end adapted to slide over the ground and having its front end upturned to facilitate its movement, said upturned end terminating in a rearwardly inclined flange 3. Arranged at the rear of this flange 3 and spaced inwardly therefrom is an upstanding plate 4 which forms a trough between its lower end and the flange into which grasshoppers or other insects may be caught when dropping from the upper portion of the plate. This plate 4 extends at its upper end over an upright support 6, and has its free rear edge 5 extended inwardly to operate to direct the insects downwardly into the container 1. A deflecting plate 7 extends from a point near the lower end of the upright 6 to a suitable height and is composed of highly polished material on its outer face to prevent the insects from obtaining a foot hold thereon, it being designed to direct the insects which fly against it or are thrown against it downward through the mouth formed between the plate 7 and the lip 5 of plate 4 as is shown clearly in Fig. 2.

A reception chamber 8 is formed at the rear of the deflecting plate 7 which constitutes the front wall of said chamber and the rear wall of this chamber 8 shown at 9 is inclined rearwardly and upwardly terminating about midway the height of the container 1 and has bearings formed therein to receive the journals as 10 of crushing rollers 11, the rollers 11 being positioned in a chamber 12 disposed at the rear of chamber 8 and extend longitudinally of the machine. These rollers 11 have their rear axles or journals 13 extended through the rear wall 14 of the chamber 12, and are rotatably mounted in and supported by upright brace bars 15 carried by V-shaped frames 16 secured to the rear wall 14 of chamber 12. The apices of these frames 16 have bearings therein to receive stub axles as 17 which project from opposite ends of the hub of a wheel 18.

Two of the frames 16 are used between which the wheel 18 is mounted as is shown clearly in Fig. 1. This wheel 18 carries on its opposite faces a pair of crown gears as 19 with which mesh pinions 20 fixed to the rear ends of the axles 13 of the rollers 11 so that when the wheel is rotated, these rollers will be turned toward each other and operate as crushing means for the insects which find their way into chamber 12.

The upwardly and rearwardly inclined wall 9 of chamber 8 is provided with a plurality of cleats 21 shown V-shaped in form as illustrated in Fig. 3 and which are designed to assist the insects in crawling up over the surface of the wall 9 into the chamber 12 which is open at its front end as shown in Fig. 2, the rollers 11 being journaled in and constituting the bottom thereof. A hinged door 22 closes the upper end of the chamber 8 and the upper end of chamber 12 is closed by wire netting or similar material 23 which will permit the light to pass freely therethrough into chamber 12 and into chamber 8 through the front opening of said chamber 12, so that the insects which enter the chamber 8 will follow the light and crawl up on to the rollers 11, which, turning inwardly will crush them and pass them into a drawer or receptacle 24 removably mounted below the rollers. This drawer 24 has a handle 25 as shown in Figs. 1 and 3 to permit its removal and insertion so that the dead insects may be cleaned out when found necessary.

The structure herein shown and described constitutes one section only of the apparatus, it being understood that a number of these sections are employed and detachably connected at their ends so that they may extend over a large surface and operate to gather in and collect the insects in the advance of the machine.

In the operation of this improved machine, the sections after being connected at their ends are moved forwardly over the field containing the insects to be destroyed, and any suitable motive power may be employed. As they move forward, the insects will fly against plates 4 and 7, and those which strike plate 4 will drop into the trough formed between it and the flange 3 and will then crawl up over plate 4 and will enter through the mouth at the top thereof into the chamber 8, while those striking against the polished surface of plate 7 will drop downwardly and pass under said plate into the chamber 8. The insects entering this chamber 8 will crawl up over the wall 9, the cleats 21 facilitating their passage over this wall, and being attracted by the light which enters from the screen top 23 of chamber 12 will enter said chamber crawling up on to the rollers 11, which turning under the action of the forward movement of the machine, will draw the insects in between them and crush them to death. The crushed insects will then be delivered into the removable container below the rollers, which may be taken out when desired and emptied.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the claimed invention.

Having thus fully described my invention, what I claim as new and desire to secure by Letters Patent, is:—

1. In an apparatus of the class described, a receptacle having an entrance at its front with a deflector, said deflector extending upward some distance above said entrance and against which the insects are designed to strike and be thrown downwardly through said entrance, a chamber at the rear of said deflector having an opening at its bottom and a closure at its top, a light chamber arranged at the back of the first-mentioned chamber, for attracting insects thereinto and communicating with said first-mentioned chamber, said light chamber being equipped with means for killing the trapped insects and the rear wall of said chamber being inclined rearwardly and provided with cleats to facilitate the passage of the insects into the light chamber.

2. In an apparatus of the class described, a receptacle having front and rear chambers communicating with each other at their upper ends, a transparent top for the rear chamber, and a light proof top for the front chamber, said front chamber having an entrance at its lower end for the passage of insects therethrough, and crushing rolls in said rear chamber arranged below the communicating opening between the chambers.

3. In an apparatus of the class described, a receptacle having front and rear chambers communicating with each other at their upper ends, crushing rolls mounted in the rear chamber, a removable container arranged below said rolls, an entrance at the bottom of said front chamber with means for deflecting insects therethrough, and an upwardly and rearwardly inclined wall at its rear side provided with cleats to facilitate the passage thereover of the trapped insects.

4. In an apparatus of the class described, a receptacle having a receiving chamber open at its lower end to the atmosphere, a highly polished deflecting plate positioned in the path of the insects for throwing them down and directing them through said opening, a chamber arranged in the rear of said reception chamber having longitudinally disposed rollers revolubly mounted therein with their axles projecting through the rear wall of said chamber, and means for rotating said rollers.

In testimony whereof I affix my signature in presence of two witnesses.

JEWETT R. CARLSON.

Witnesses:
BENJAMIN L. LARSEN,
GEO. D. SPRAIN.